(12) United States Patent
Hampton et al.

(10) Patent No.: US 8,966,506 B2
(45) Date of Patent: Feb. 24, 2015

(54) METHOD AND APPARATUS FOR MANAGING RELATED DRIVERS ASSOCIATED WITH A VIRTUAL BUS DRIVER

(75) Inventors: Kathryn A. Hampton, Los Gatos, CA (US); Gaines C. Teague, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2863 days.

(21) Appl. No.: 10/831,469

(22) Filed: Apr. 23, 2004

(65) Prior Publication Data

US 2005/0240942 A1  Oct. 27, 2005

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |

(52) U.S. Cl.
CPC .................................. *G06F 9/4411* (2013.01)
USPC ........................................................ 719/321

(58) Field of Classification Search
USPC ................................. 719/321, 324
See application file for complete search history.

(56) References Cited

U.S. PATENT DOCUMENTS

| | | | | |
|---|---|---|---|---|
| 4,974,151 | A * | 11/1990 | Advani et al. ...................... | 710/8 |
| 5,309,563 | A | 5/1994 | Farrand et al. | |
| 5,455,907 | A | 10/1995 | Hess et al. | |
| 5,630,076 | A * | 5/1997 | Saulpaugh et al. ........... | 710/104 |
| 5,655,148 | A * | 8/1997 | Richman et al. ................... | 710/8 |
| 5,732,282 | A * | 3/1998 | Provino et al. ................. | 719/324 |
| 5,761,411 | A | 6/1998 | Teague et al. | |
| 5,923,876 | A | 7/1999 | Teague | |
| 6,003,097 | A * | 12/1999 | Richman et al. ................... | 710/8 |
| 6,041,364 | A * | 3/2000 | Lortz et al. ..................... | 719/321 |
| 6,654,881 | B2 * | 11/2003 | Cabrera et al. ................ | 713/100 |
| 6,763,454 | B2 * | 7/2004 | Wilson et al. ..................... | 713/1 |
| 7,082,598 | B1 * | 7/2006 | Le et al. ......................... | 717/127 |
| 7,096,473 | B2 * | 8/2006 | Ruget et al. .................... | 719/321 |
| 7,127,451 | B1 * | 10/2006 | Kimura ............................. | 707/3 |
| 7,181,382 | B2 * | 2/2007 | Shier et al. ...................... | 703/13 |
| 7,493,626 | B2 * | 2/2009 | Resch ............................ | 719/321 |
| 2002/0124007 | A1 * | 9/2002 | Zhao ............................. | 707/102 |
| 2002/0178300 | A1 * | 11/2002 | Dubal et al. .................. | 709/321 |
| 2003/0126309 | A1 * | 7/2003 | Camble et al. ................ | 709/321 |
| 2004/0003135 | A1 * | 1/2004 | Moore .......................... | 709/321 |
| 2004/0024855 | A1 * | 2/2004 | Tsai et al. ..................... | 709/223 |
| 2005/0102682 | A1 * | 5/2005 | Shah et al. .................... | 719/321 |

OTHER PUBLICATIONS

U.S. Appl. No. 10/401,232, filed Mar. 27, 2003, Hampton et al.
U.S. Appl. No. 10/401,230, filed Mar. 27, 2003, Garcia et al.

* cited by examiner

*Primary Examiner* — Emerson Puente
*Assistant Examiner* — Kacy Verdi
(74) *Attorney, Agent, or Firm* — Fletcher Yoder

(57) ABSTRACT

Provided are an apparatus and method for managing related drivers associated with a bus driver. In one embodiment, the apparatus may comprise a physical device object table configured to contain a plurality of entries, a child device associated with each of the plurality of entries, each of the child devices configured to have a name associated therewith, the name configured to provide information about the child device sufficient to allow user environment applications an doperating system drivers to directly access the child device, and a virtual bus driver configured to interface between the child devices and an adapter.

26 Claims, 4 Drawing Sheets

METHOD AND APPARATUS FOR MANAGING RELATED DRIVERS ASSOCIATED WITH A VIRTUAL BUS DRIVER

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, an operating system typically is utilized to perform different software programs or applications. The operating system and applications may communicate with peripheral devices and networks through adapters to input and output data. Each of the adapters associated with a peripheral device or network access point may have a specific object name that represents the particular adapter based upon, for example, a slot that the adapter is attached to in the computer system or a name created by another managing component. The operating system may invoke different drivers that manage the interaction between the adapter and its device and other components, such as applications and/or the operating system.

However, if multiple devices are associated with a single slot in the computer system, each of the adapters or devices may be referenced by the same name or may not be identifiable to other system components because the adapters are associated with same slot. This may also occur if a single adapter can provide the functionality of multiple adapters or devices. Furthermore, the association might not be visible to software components, which are designed to exploit the association. Accordingly, if a device or software component receives a notification from a device that does not have a unique or identifiable object name, the receiving device or software component may be unable to directly use the notification because of the resulting ambiguity. As a result, the computer system may not operate as efficiently and system performance is degraded.

BRIEF DESCRIPTION OF THE DRAWINGS

Exemplary embodiments of the present invention may be apparent upon reading of the following detailed description with reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention may provide a methodology for managing related drivers associated with a bus driver. The bus driver may be a physical bus driver that is responsible for managing physically separate adapters connected to a bus it manages or a virtual bus driver that is responsible for managing multiple capabilities offered by a single adapter. The bus driver may utilize a naming mechanism to identify the child devices that are initiated by the bus driver. The naming mechanism may utilize the class or type of a child device along with the object name of the bus driver to create a unique and identifiable object name that identifies the child device. By utilizing this unique object name, another device may utilize the object name of the child device to directly access the child device. As a result, each child device of a bus driver, such as a physical or virtual bus driver, may have a unique object name that identifies the bus driver and the class of the child device.

Figure 1:
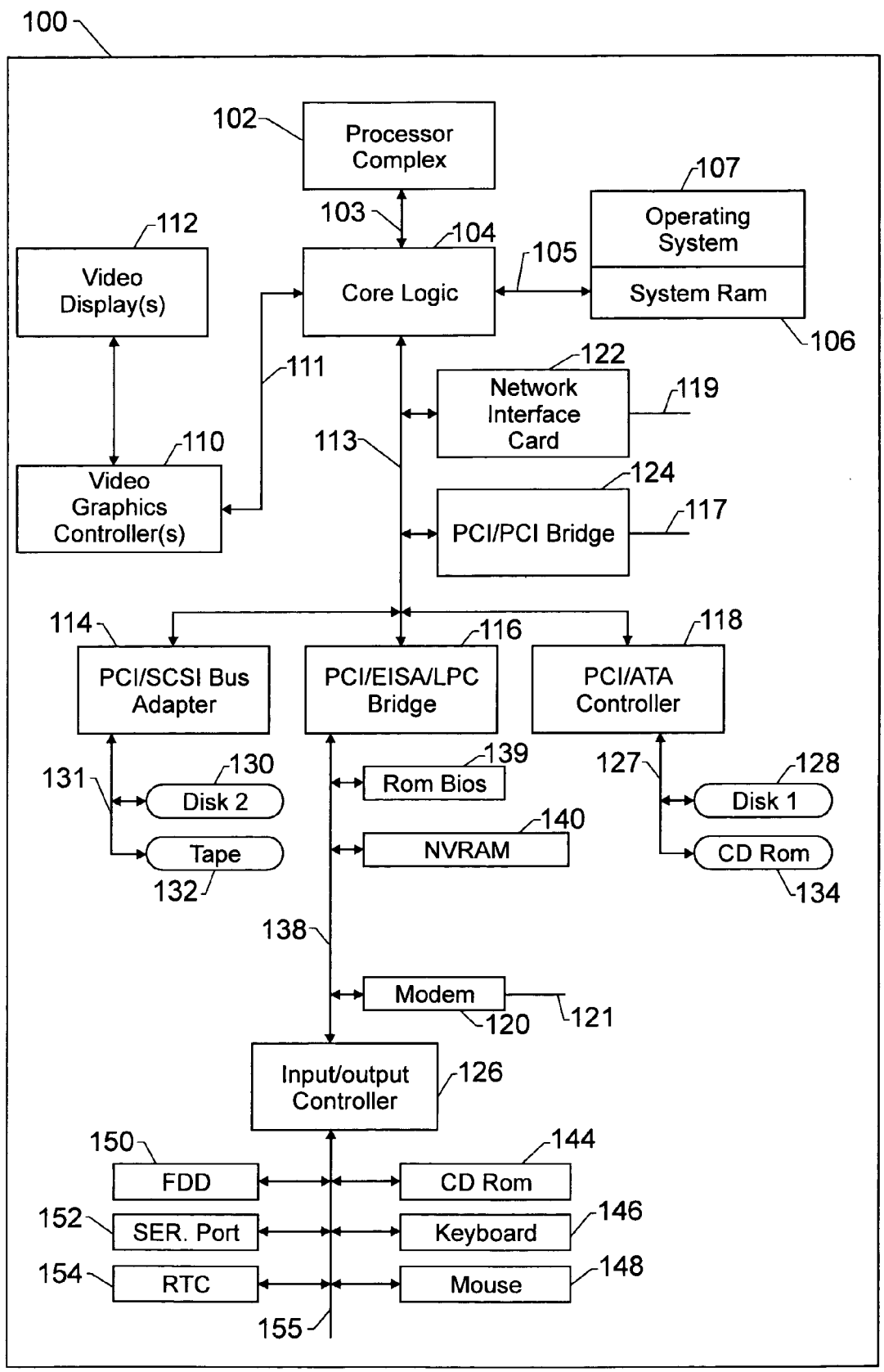
FIG. 1 is a block diagram illustrating an exemplary computer system in accordance with embodiments of the present invention.

Referring initially to FIG. 1, a block diagram illustrating an exemplary computer system in accordance with embodiments of the present invention is shown. The computer system is generally referred to by the reference numeral 100. The architecture of the computer system 100 is given for purposes of illustration only, as one example of a computer system in which embodiments of the present invention may be employed.

The computer system 100 may comprise a processor complex 102, which may include one or more central processing units ("CPUs"). A core logic chipset 104, which may manage a variety of functions on behalf of the processor complex 102, may be connected to the processor complex via a processor interface point-to-point link or a processor bus 103.

The core logic chipset 104 may be connected via memory bus 105 to a system random access memory 106, which may comprise static random access memory ("SRAM"), dynamic random access memory ("DRAM") or other suitable memories. The memory 106 may be a shared system memory to hold memory resident files or information. Within the memory 106 may be an operating system 107 that may be utilized to manage the interaction between the different hardware and software components to enable the components to work together. The operating system 107 may be MS-DOS, Unix, Windows, Mac OS, and other platform specific operating systems. A video graphics controller 110 may be connected to the core logic chipset 104 via a video bus 111 to provide a signal that produces a display image on a video display 112.

A bus 113, such as a peripheral component interface ("PCI") bus or the like, may connect the core logic chipset 104 to a variety of system devices, such as a network interface card 122 and a PCI/PCI bridge 124. The network interface card 122 may provide communication capability to the computer system 100 via a communication bus 119. The communication bus 119, which may be a physical or wireless connection, may be connected to other computer systems. The PCI/PCI bridge 124 may provide capacity for additional PCI devices on a PCI bus 117.

A PCI/SCSI bus adapter 114 may provide access to SCSI devices such as a disk drive 130 and a tape drive 132 via a SCSI bus 131. A PCI/ATA controller 118 may provide access to additional devices, such as a disk drive 128 and a CD ROM drive 134 via a bus 127. A PCI/EISA/LPC bridge 116 may provide access to system devices, such as a read only memory basic input/output system ("ROM BIOS") 139, a non-volatile memory ("NVRAM") 140, a modem 120 or the like via a bus 138. The NVRAM 140 may include flash memory or the like, while the modem 120 may provide communication access via a phone line 121. The BIOS 139 may be system firmware that is stored in ROM and utilized to load the operating system 107. An input/output controller 126, which may be connected to the bus 138, may provide access to system devices such as a CD ROM drive 144, a keyboard 146, a mouse 148, a floppy disk drive 150, a serial port 152, a real time clock ("RTC") 154, and the like via a bus 155.

To provide access to the peripheral devices, such as the network interface card 122, the disk drives 128 and 130, the tape drive 132, and the CD ROM 134, for example, named objects are created and associated with different hardware and software components, which may be managed by the operating system 107. For instance, each peripheral device may include an adapter or be coupled to an adapter, which may be a hardware or software component associated with drivers that are utilized to interface with a specific bus 113, 117, 127, 131 or 138, and/or applications. The adapter may be coupled into a slot to form an electrical connection with the specific bus. Each adapter may be represented as a named object to the operating system 107 and other devices within the computer system 100. The hardware and software components utilized to provide the interaction to the peripheral devices is shown in greater detail in FIG. 2.

Figure 2:
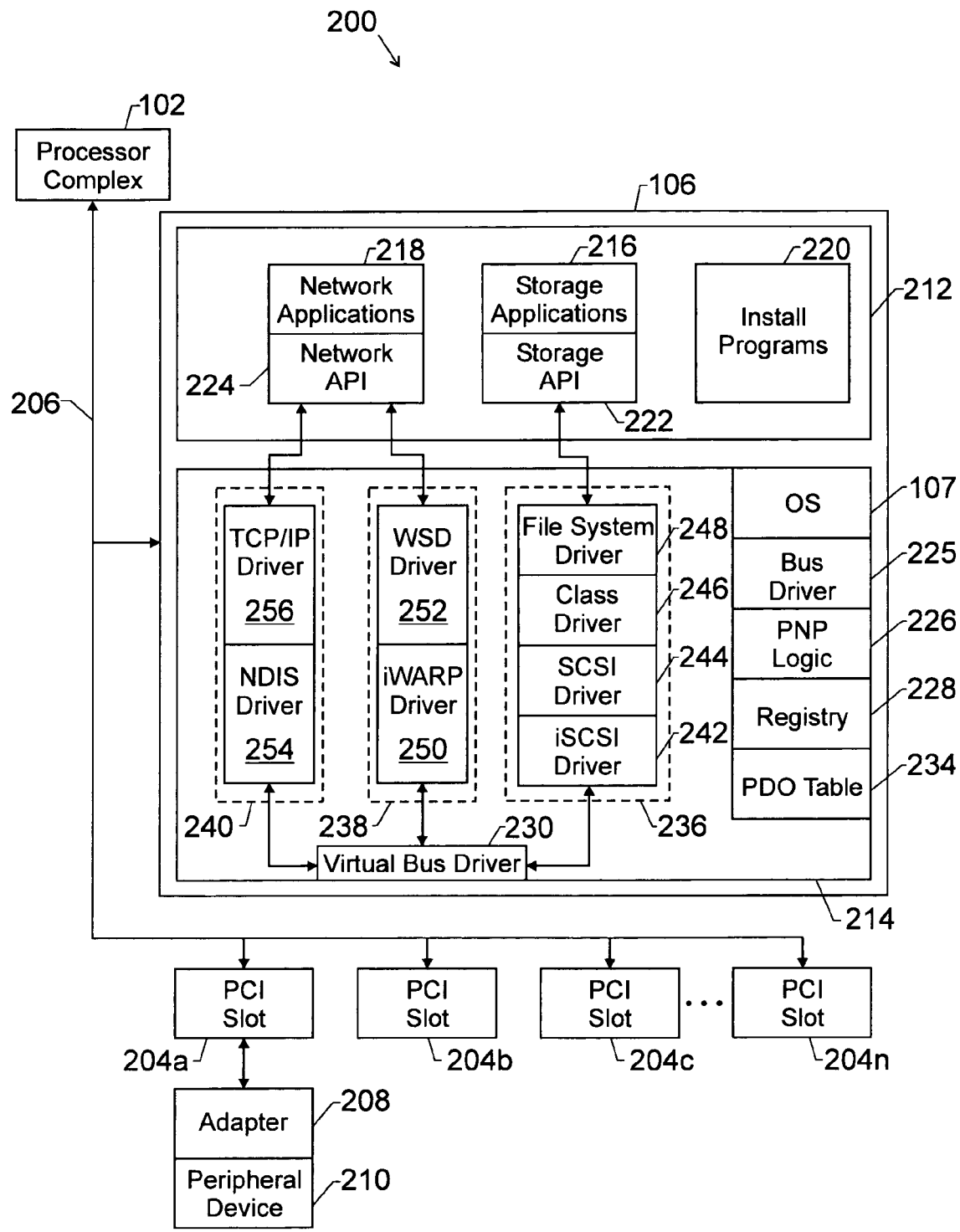
FIG. 2 is a block diagram depicting an exemplary embodiment of hardware and software components of the computer system of FIG. 1 in accordance with embodiments of the present invention is illustrated.

Turning now to FIG. 2, a block diagram 200 depicting an exemplary embodiment of hardware and software components of the computer system of FIG. 1 in accordance with embodiments of the present invention is illustrated. FIG. 2 shows the processor complex 102 of FIG. 1 and the structure of one of the memory devices of the computer system 100. For purposes of illustration, the memory device is the RAM memory 106 of FIG. 1. Additionally, other relevant structures, such as an adapter 208, may correspond to the network interface card 122 or part of the disk drive 130 from FIG. 1. Those of ordinary skill appreciate that the present technique may not be limited to a computer system, but may applicable to other devices, such as handhelds devices, personal organizers, cellular telephones, network equipment, or other similar processor based units which may benefit from improved management of physical device objects.

The computer system 100 may include one or more processors, such as the processor complex 102 of FIG. 1, which is utilized to operate the computer system 100. The processor complex 102 may communicate with memory 106 and PCI slots 204a-204n over a bus 206. The bus 206 may provide an interconnection between various system components, such as the core logic 104, the PCI/PCI Bridge 124, the PCI/SCSI Bus Adapter 114, the PCI/EISA/LPC Bridge 116, and/or the PCI/ATA Controller 118 of FIG. 1, and the like.

The processor complex 102 accesses peripheral devices, such as the other computer systems that may be coupled to the network interface card 122 via the communication bus 119 and the disk drive 130, through the PCI slots 204a-204n. The PCI slots 204a-204n may provide an electrical path for power and/or signals to be exchanged between the various components of the computer system 100, such as the processor complex 102 and the memory 106. These signals may be exchanged with an adapter 208, such as the network interface card 122, which is a part of the peripheral device 210 or connected to the peripheral device 210. For instance, the adapter 208 may be the network interface card 122 or may be part of the disk drive 130, which is accessible through the PCI slot 204a. The adapter 208 may include hardware information, such as a hardware identification, which is utilized to load appropriate software components or drivers, as discussed below.

Because the processor complex 102 controls the functioning of the device or the computer system 100, which is generally under the control of software programming, memory 106 is coupled to the processor complex 102 to store and facilitate the execution of software programs. For instance, the memory 106 may include the system RAM 106 or the NVRAM 140 of FIG. 1. The memory 106 may be used to store instructions, drivers 242-256, applications 216-220, PDO table 234, and/or data that may be utilized to facilitate control or manage the operation of the computer system 100. Within the memory 106, a user environment 212 and an operating ("OS") environment 214 may be utilized to manage the operation of the computer system.

In the user environment 212, applications, such as storage applications 216, network applications 218, and/or installation programs 220, perform specific functions or operations for the computer system 100. For instance, the storage applications 216 may provide storage capabilities to tape drives, while network applications 218 may provide networking capabilities or access through the network interface card 122. Also, the installation programs 220 may be utilized to load drivers and install adapters for the peripheral devices. Further, the applications 216-220 may utilize application programming interfaces ("APIs"), such as a storage API 222 and a network API 224, for example, to interact with the OS environment 214. The APIs 222 and 224 are sets of rules for calling other software programs, applications, or drivers to facilitate the exchange of information. As an example, the network application 218 may include Windows Sockets Applications and/or Windows Sockets, while the network API 224 may include Windows Sockets Direct ("WSD") or a portion of WSD, such as the Windows Sockets Switch. Accordingly, through the APIs 222 and 224 or directly, the applications 216-220 may interact with other components or devices as directed by the operating system 107 to perform specific functions or operations for the computer system 100.

In the OS environment 214, the operating system 107 may be utilized to interact with the different hardware and software components, which enables the components to work together. Within the OS environment 214, the operating system 107 may include a kernel that provides basic services to other parts of the operating system 107 to operate several programs or applications (multi-tasking) and to provide the interconnection between other networks and/or peripheral devices. As such, in the OS environment 214, the operating system 107 may manage the access to data, software components, and/or hardware components, which are discussed below.

As part of the OS environment 214, the operating system 107 may include a physical bus driver 225, plug-and-play ("PNP") logic 226 and a registry 228 to maintain the associations of applications 216-220, APIs 222-224 and drivers 242-256. The physical bus driver 225 may detect the presence of adapters and devices attached to the any of the buses that the physical bus driver 225 manages, and report the presence of the adapters and devices to the PNP logic 226. The physical bus driver 225 may create named objects to represent each device reported to the PNP logic 226. The PNP logic 226 may manage the addition or installation of peripheral devices and the allocation of resources to the peripheral devices based on the plug-and-play rules. Through the use of the PNP logic 226, resources may be allocated to peripheral devices coupled to the PCI slots 204a-204n. In addition, the PNP logic 226 may notify the operating system 107 of installed devices and handle queries from the operating system 107. Furthermore, a registry 228 may be utilized to store relationships between the applications 216-220, APIs 222 and 224, and the associated drivers 242-256, which are discussed below. The registry 228 may provide access for adapter management graphical user interfaces through APIs (not shown), Simple Network Management Protocol/Insight Management agents through APIs (not shown), storage APIs 222, network APIs 224, and other applications or system utilities to access the drivers being utilized to perform input/output functions with adapters on behalf of the operating system 107.

Further, adapter drivers, such as the virtual bus driver ("VBD") 230, may be utilized to manage the adapters, such as adapter 208, that are coupled to the PCI slots 204a-204n. The VBD 230 may be an adapter driver that manages the communication between the adapter 208 and the operating system 107 through the bus 206. The VBD 230 may create named objects for child devices and report the presence of child devices to the PNP logic 226. The child devices, which are represented as named objects, may be utilized to interact with different drivers 242-256 or applications 216-220, as discussed below. Through the use of the VBD 230 or the PNP logic 226, resources, such as memory space, input/output ("I/O") addresses, and interrupts are allocated to the adapter 208 coupled to the PCI slot 204a-204n. In addition, the VBD 230 may notify the operating system 107 and/or the PNP logic 226 of child devices and process queries from the operating system 107 and/or the PNP logic 226.

To maintain the relationships between devices, the operating system 107 may utilize a physical device object ("PDO") table 234. For each device, a PDO entry may be created in the PDO table 234, which is a data structure that represents the device. The PDO table 234 may include information about each of the devices, such as a name of the object that represents the device, address information, the class information, object type information, and/or other information, which is discussed further in FIG. 3. This information may be stored within the adapter 208, the peripheral device 210 and/or within the memory 106. The object name of the device may be created by the VBD 230 or the PNP logic 226. Once the object name of the device is determined, it is reported to the operating system 107 and a PDO entry is created in the PDO table 234 for use by other software and hardware components in the computer system 100.

Accordingly, additional drivers, such as drivers 242-256, may be utilized to manage and facilitate the communication and interaction between the VBD 230 in the OS environment 214 and applications 216-220 or APIs 222 and 224 in the user environment 212. Each of these drivers 242-256 may be associated with other drivers 242-256 through stacks 236-240 that are utilized to manage the operations between hardware components, drivers 242-256, or the user environment 212 for the operating system 107. For instance, the storage applications 216 may interact with a storage stack 236 that includes an Internet small computer system interface ("iSCSI") driver 242, a small computer system interface ("SCSI") driver 244, a class driver 246, and/or a file system driver 248 to provide access to the disk drive 130 through the VBD 230. Similarly, the network applications 214 may interact with a remote data memory access ("RDMA") stack 338 that includes an iWARP driver 250 along with a WSD driver 252 to provide RDMA services and a network device interface specification ("NDIS") stack 240 that includes an NDIS driver 254 along with a transmission control protocol/Internet protocol ("TCP/IP") driver 256 to provide TCP/IP services to the network interface card 122 through the VBD 230. In addition, it should be noted that the VBD 230 may provide access to the individual stacks 236-240, or a combination of the stacks 236-240 depending on the configuration. As a result, by utilizing these various drivers 242-256, the operating system 107 may facilitate communication between user environment 212 and the OS environment 214 to provide access to the peripheral devices attached to the PCI slots 204a-204n through adapters, such as the adapter 208.

Because the VBD 230 may create separate functional device stacks 236-240 for the adapter 208 coupled to one of the PCI slots 204a-204n, the VBD 230 may form multiple child devices that are associated with the VBD 230. As an example, the network interface card 122 may be coupled to the PCI slot 204a, which interacts with the VBD 230. The VBD 230 may provide storage services through the iSCSI driver 242, SCSI driver 244, class driver 246, and file system driver 248, RDMA services through the iWARP driver 250 and WSD driver 252, and TCP/IP services through the NDIS driver 154 and TCP/IP driver 256. In this configuration, the child devices of the VBD 230 are the iSCSI driver 242, the iWARP driver 250 and the NDIS driver 254. Accordingly, the VBD 230 may manage three different child devices that each provides a different service to the computer system 100.

In providing these different services, named objects are created for each of the child devices, and associated with entries into the PDO table 234. As noted above, the child devices, which may comprise the drivers 242, 250, and 254, may be named by the VBD 230 with the same object name in the PDO table 230 or may be named with a general name that is not descriptive of the service or function provided by the driver. This creates confusion for other devices, such as drivers 242-256, applications 216-220, and APIs 222 and 224, because the named objects in the PDO table 234 are the same for each child device. For example, if a device, such as drivers 242-256, applications 216-220, and APIs 222 and 224, is notified of a child device in a type or class that is of interest to the device, then the device may not be able to access the information associated with the child device because the named object is associated with multiple entries in the PDO table 234. As another example, the NDIS driver 254 is a child device of the VBD 230 along with the iSCSI driver 242 and the iWARP driver 250. The TCP/IP driver 256, which is associated with the NDIS driver 254, may include a notification function that informs any interested drivers 242-254 about the IP address associated with the NDIS stack 240. The notification may include the IP address, the object name of the device, and/or the PDO. The WSD driver 252, which may be associated with the RDMA stack 238, may not be able to directly use the information provided by the TCP/IP driver 256 in the notification. This problem may be further compounded through the use of NDIS load balancing drivers, or other similar components.

However, the VBD 230 may utilize a naming mechanism to create a unique or identifiable object name for each child device associated with the VBD 230. The naming mechanism may rely on the fact that each child device is categorized based on the device class, which is represented by a name and an identification value called a globally unique identifier ("GUID"). The device class is identified during installation and utilized for installation purposes. When a new member of the device class has been added or the operating system 107 has been queried, the devices, such as applications 216-220, APIs 222 and 224, and/or drivers 242-256, may be notified or provided a list of PDO entries in a specific device class along with the associated object name. The object name of the child device may include the object name of the VBD 230 along with a value or indicator that relates to the child device created by the VBD 230. The indicator may include the value of the class identifier for the child device, which is appended to the end of the object name of the VBD 230. For example, if the VBD 230 has an object name of "PCI_DEVICE_008," then a NDIS driver 254 may have an object name of "PCI_DEVICE_008-net12345" an iSCSI driver 242 may have an object name of "PCI_DEVICE_008-scsi23232," and an iWARP driver 250 may have an object name of "PCI_DEVICE_008-rdma76985."

Advantageously, if the VBD 230 utilized the naming mechanism to create named objects for the child devices, then other devices, such as applications 216-220, APIs 222 and 224, and/or drivers 242-256, may utilize the object name of the child device to directly access the child device, which enhances the operation of the computer system 100. For instance, the WSD driver 252 may determine the IP address and/or the associated VBD 230 from a TCP/IP notification or from querying the operating system 107 for a list of named objects in the TCP/IP class. In addition, a storage component may utilize TCP/IP to gain access to the network to provide storage for the computer system 100. If the storage component, such as the iSCSI driver 242, supports TCP/IP Offload or other similar features, the storage component may utilize the object name of the child device to directly gain access to the NDIS driver 254. Accordingly, an exemplary embodiment of the utilization of the naming mechanism for entries in the PDO table 234 to facilitate this access between device objects is discussed below in FIG. 3.

Figure 3:
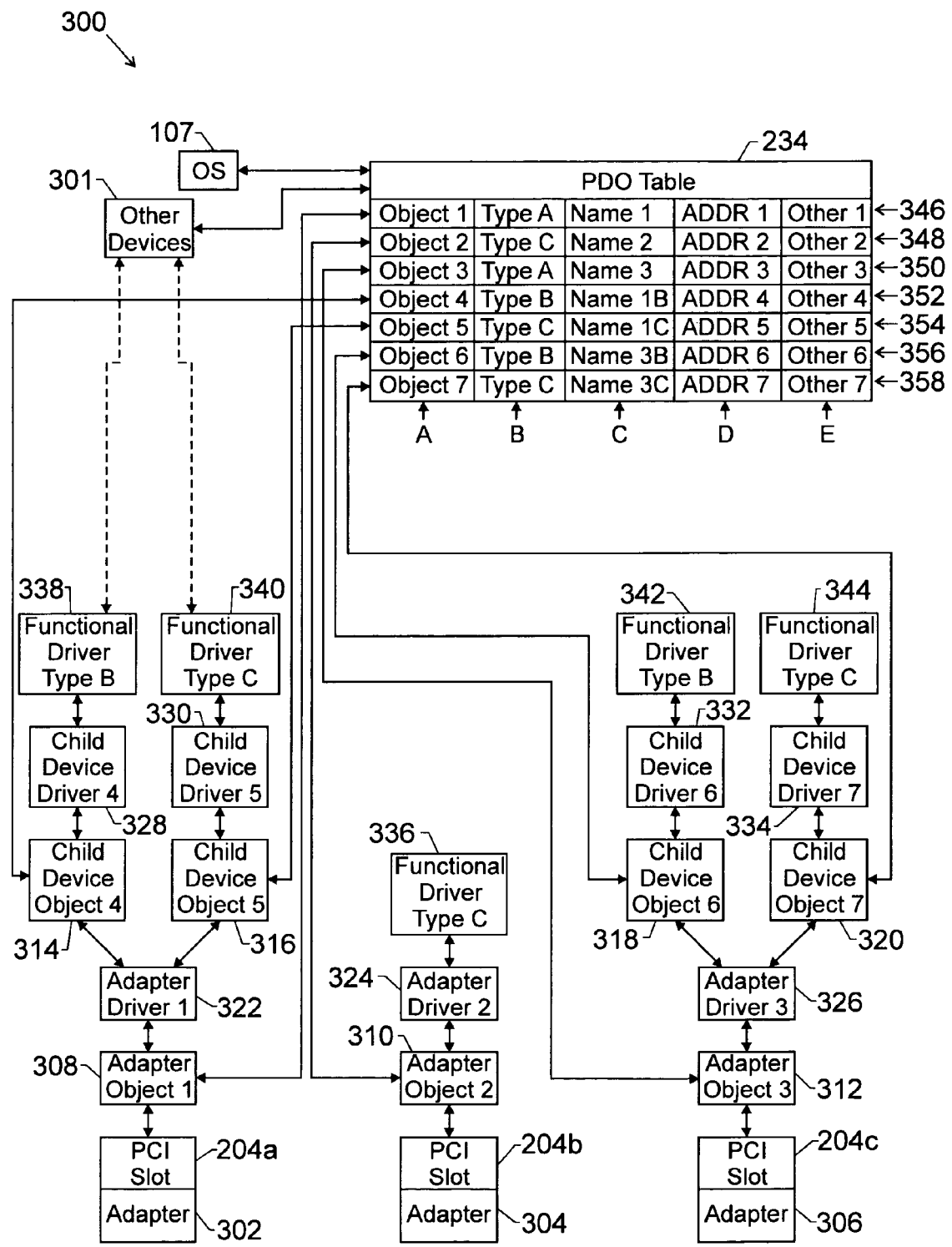
FIG. 3 is a block diagram illustrating the exemplary interaction of the entries of the physical device object table with the virtual bus drivers and associated child devices in accordance with embodiments of the present invention.

FIG. 3 is a block diagram illustrating the exemplary interaction of the entries of the physical device object table with virtual bus drivers and associated child devices in accordance with embodiments of the present invention. The diagram shown in FIG. 3 is generally referred to by reference numeral 300. As shown in FIG. 3, various adapters 302-306 are coupled to the PCI bus slots 204a-204c to interact with portions of the computer system 100, such as the operating system 107 or other devices 301, which may include different entities, such as applications 216-220, APIs 222 and 224, and the PNP logic 226 (FIG. 2). The operating system 107 may utilize adapter objects 308-312, child device objects 314-320, adapter drivers 322-326, child device drivers 328-334, and functional drivers 336-344 to communicate and access the adapters 302-306. The adapters 302-306 may be exemplary embodiments of the adapter 208 (FIG. 2).

The adapters 302-306 may be coupled to the PCI slots 204a-204c to provide access to the respective peripheral device. Within the OS environment 214, the adapters 302-306 may be associated with adapter objects 308-312, which represent the adapter drivers 322-326, in the PDO table 234. The adapter objects 308-312 may be created by the operating system 107 when the operating system 107 receives notification about the presence of the adapters 302-306 from the adapter drivers 322-326 or the other devices 301. The adapter objects 308-312 may be represented by entries 346-350 in the PDO table 234. Similarly, child devices, such as the drivers 242, 250, and 254 (FIG. 2), may be represented by child device objects 314-320 defined by entries 352-358 in the PDO table 234. The entries 352-358 may be provided by the operating system 107 when the operating system 107 receives notification about the presence of the adapters 302-306 from the adapter drivers 322-326 or the other devices 301. The object names for the child device objects 314-320 may be created by the adapter drivers 322 and 326, which may be embodiments of the VBD 230 (FIG. 2). With each of the adapter objects 308-312 and child device objects 314-320 created, the operating system 107 may start the associated adapter drivers 322-326 and child device drivers 328-334. The drivers 322-334 may provide interaction between the objects 308-320 and the functional drivers 336-344 or may operate as a virtual bus driver ("VBD"), which creates child devices, such as the child device objects 314-320. The functional drivers 336-344 provide the interaction between the drivers 322-334 and the other devices 301, which is shown in the dashed lines from functional drivers 338-340. It should be appreciated that each of the functional drivers 336-344 may interact with the other devices 301.

To manage the objects 308-320, the PDO table 234 includes different entries 346-358, which are associated with the objects 308-320. The entries 346-358 in the PDO table 234 may include a PDO column A, a class column B, a name column C, an address column D, and an additional information column E. The PDO column A may include a data structure reference for the objects 308-320, while the class column B may include the type or class of the device associated with the objects 308-320. The name column C may include the object name of the device for the objects 308-320, while the address column D may include any IP addresses, or other related address information for the objects 308-320. The additional information column E may include other information about the objects 308-320. Through the use of the PDO table 234, the operating system 107 may maintain a list of the information referenced through the PDO and the associated object names.

An example of the two exemplary layered structures that may be formed in the computer system 100 are shown through interactions of the first adapter 302 or third adapter 306 along with the second adapter 304. With the first adapter 302, an adapter object 308 is created and associated with an adapter driver 322. The adapter driver 322 may be an exemplary embodiment of the VBD 230 (FIG. 2). The adapter driver 322 causes the creation of the child device object 314 that is associated with the child device driver 328 and functional driver 338 and the child device object 316 that is associated with the child device driver 330 and the functional driver 340. The functional drivers 338 and 340 manage the interaction with the application for the respective adapter drivers 328 and 330. Alternatively, with the second adapter 304 the adapter object 310 is created and associated with an adapter driver 324. The adapter driver 324 is associated with the functional driver 336, which may manage the interaction with the application for the adapter drivers 328.

The VBD, which may comprise the adapter drivers 322 and 326, utilizes a naming mechanism to create a unique or identifiable object name for each of the PDO entries 352-358, which may represent the drivers 328-334. For instance, in the name column C of the PDO table 234, the entry 352 may have an object name of "NAME1B," which is the object name of the adapter object 308 ("NAME1") along with the class type ("B") appended to the end of the object name of the adapter object 308. Similarly, the entry 354 may have a name of "NAME1C," which is the object name of the adapter object 308 ("NAME1") with the type of the object ("C") appended to the object name of the adapter object 308. Without this naming mechanism, the entry 346 of the adapter object 308 and the entries 352 and 354 of the child device objects may have the same object name in the name column C, which would be "NAME1," or may be given a name that is not identifiable with the function or service provided by of the driver. Accordingly, the naming mechanism differentiates the object names in the PDO table 234 from each other to clarify the associations in the PDO table 234 and for referencing the object names directly.

In accordance with embodiments of the present invention, devices, such as applications 216-220, APIs 222 and 224, and/or drivers 242-256, may be allowed to access the PDO entries 346-358 based on the object name and to identify related drivers based on the object name. For instance, if a device is able to match drivers 322-344 based on the object name, then the device may directly match an underlying driver 322-344 or adapter 302-306 based on the object name. Also, the device may track the arrival of adapters 302-306 or adapter drivers 322-344 of a specific class and identify the associated VBD, such as drivers 322 and 326, associated with that specific class.

Figure 4:
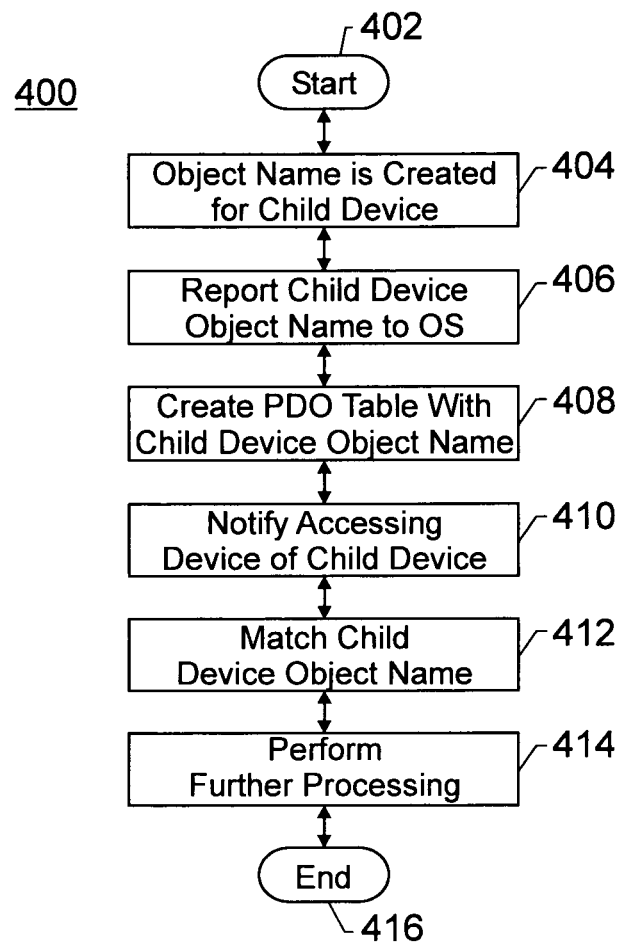
FIG. 4 is a process flow diagram in accordance with embodiments of the present invention.

Turning to FIG. 4, a process flow diagram is illustrated to describe a process in accordance with embodiments of the present invention. In the diagram, generally referred to by reference numeral 400, a child device, such as the child device drivers 328-334 (FIG. 3), may be implemented with a unique object name associated with the respective VBD, such as adapter drivers 322 and 326. By creating a unique object name for the child device and accessing devices, such as other drivers 322-344, applications 216-220, APIs 222 and 224, or the operating system 107, may identify the child device from the object name of the child device. As such, the accessing device may obtain information about a specific child device or VBD. Also, the accessing device may notify and/or configure other devices to access the VBD or child device based on the object name of the child device.

The process begins at block 402. At block 404, a VBD may create an object name for a child device. The child device may be iWARP driver, an NDIS driver, and/or an iSCSI driver associated with the VBD. The object name of the child device may be a combination of the object name for the VBD along with an attribute, which may be the class identification or type of child device, for example. Then, the VBD may report the presence of the child device to the operating system, which may be the operating system 107 (FIG. 2) or managing processor, as shown in block 406. At block 408, the operating system may create an entry into a PDO table, such as the PDO table 234 (FIG. 3), for the child device, which includes the object name, the class type, the PDO identifier, and/or other associated information, such as the IP address for the child device, for example.

The accessing device may be notified or informed of the object name for the child device at block 410. The accessing device may be informed through a query of the PDO table or from a driver or application that monitors the arrival of certain types of devices in a specific class. At block 412, the accessing device may match the object name of the child device to another device by comparing the object names or a portion of the object names. The matching of the object names may include comparing the object name of the child device with the object name of another device or the object name of the VBD. From the matching of the object names, the accessing device may utilize the object name of the child device for further processing at block 414. The further processing may include accessing information from the PDO table, and/or notifying another device of the information determined from the object name of the child device. Accordingly, the process ends, as shown at block 416.

Alternatively, it should be appreciated that the naming mechanism may also be applied to the child devices associated with a physical bus driver, such as the physical bus driver 225 (FIG. 2), along with other components. For example, the adapters on a particular bus may be managed by a physical bus driver. Accordingly, the child devices associated with that physical bus driver may be named utilizing the physical bus driver name along with a naming identifier, such as the type or class of the child device. As a result, a software component may identify the child devices that are on the same bus and other relationships from the object name of the child device. This may be advantageous for fault tolerant software on a server that includes multiple buses to map the traffic on different failure domains (i.e. different buses).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An apparatus for managing related drivers associated with a virtual bus driver, comprising:
   a physical device object table stored on a non-transitory tangible computer readable medium of a system having a processor, and configured to contain a plurality of entries;
   a plurality of child devices stored on a non-transitory tangible computer readable medium of the system, wherein each of the plurality of child devices is associated with each of the plurality of entries, and each of the plurality of child devices is configured to have a name, associated therewith, the name stored in the physical device object table, wherein the name is configured to provide information about a child device to allow user environment applications and operating system drivers to directly access the child device; and
   a virtual bus driver stored on a non-transitory tangible computer readable medium of the system, and configured to interface between the child device and an adapter coupled to one of a plurality of bus slots associated with a bus bridge that manages a bus.

2. The apparatus set forth in claim 1, comprising a management module associated with the adapter that associates the name with each of the plurality of child devices.

3. The apparatus set forth in claim 1, wherein the virtual bus driver is configured to create the name associated with each of the plurality of child devices.

4. The apparatus set forth in claim 1, wherein the adapter is associated with a bus slot.

5. The apparatus set forth in claim 4, wherein the bus slot is one of a plurality of bus slots on a peripheral component interconnect ("PCI") bus.

6. The apparatus set forth in claim 1, wherein at least one of the plurality of child devices is associated with at least one of a storage application and a network application.

7. The apparatus set forth in claim 1, wherein at least one of the plurality of child devices is associated with an iWARP driver, a network device interface specification driver, and a iSCSI driver.

8. A system, comprising:
   a processor;
   a memory configured to store an operating system and a physical device object table for access by the processor;
   a bus having a plurality of bus slots coupled to the processor;
   at least one driver associated with one of the plurality of bus slots; and a plurality of child devices stored on the memory and associated with the at least one driver, wherein each of the plurality of child devices is associated with an object name stored in the physical device object table, wherein the object name provides information about each of the plurality of child devices to allow user environment applications and operating system drivers to directly access each of the plurality of child devices.

9. The system set forth in claim 8, comprising plug and play logic operable to create each object name for the plurality of child devices, and configured to report each object name to the operating system.

10. The system set forth in claim 8, wherein the physical device object table is operable to associate a class identifier and address information with each object name.

11. The system set forth in claim 10, comprising an application stored in the memory for use by the processor, the application configured to utilize the class identifier associated with the object name of at least one of the plurality of child devices to identify a set of the plurality of child devices that is within a specific class.

12. The system set forth in claim 11, wherein the application is configured to utilize the set of the plurality of child devices to communicate via an internet protocol address.

13. The system set forth in claim 11, wherein the application comprises a windows sockets direct ("WSD") application.

14. The system set forth in claim 8, comprising an adapter of a peripheral device coupled to one of the bus slots and configured to communicate with the operating system through one of the plurality of child devices.

15. The system set forth in claim 14, wherein the peripheral device is a tape drive or another computer system.

16. A method for managing related drivers associated with a virtual bus driver comprising:
creating an object name for each of a plurality of child devices of a computer system, wherein the object name provides information about each of the plurality of child devices to allow user environment applications and operating system drivers of the computer system to directly access each of the plurality of child devices;
creating, for each of the plurality of child devices, an entry in a physical device object table, wherein the entry comprises the object name for each of the plurality of child devices;
providing at least one object name to an accessing device;
matching, by the accessing device, the at least one object name to an object name of another device; and
performing further processing, utilizing the object name by the accessing device, based on the matching of at least one object name, wherein the further processing comprises accessing information from the physical device object table, or notifying another device of the information determined from the object name of the child device, or a combination thereof.

17. The method set forth in claim 16, comprising reporting the object name for each of the plurality of child devices to an operating system.

18. The method set forth in claim 17, comprising creating a physical device object table by the operating system, wherein one of a plurality of entries in the physical device object table is associated with the at least one object name.

19. The method set forth in claim 16, comprising accessing an object name of a virtual bus driver associated with a child device and appending the class type of the child device to the object name of the virtual bus driver.

20. The method set forth in claim 16, comprising creating the object name for each of the plurality of child devices using a virtual bus driver.

21. The method set forth in claim 16, wherein creating the object name for each of a plurality of child devices comprises creating a name from a combination of a name entry and one or more of a physical device object entry, a class entry, an address entry, or an additional information entry located in a physical device object table.

22. An apparatus for managing related drivers associated with a bus driver comprising:
a physical device object table stored on a non-transitory tangible computer readable medium, and adapted to contain a plurality of entries;
a plurality of child device objects stored on a non-transitory tangible computer readable medium, wherein each of the plurality of child device objects is associated with each of the plurality of entries, and each of the plurality of child device objects is configured to have an associated object name stored in the physical device object table and that provides information about a child device object, associated therewith, to allow user environment applications and operating system drivers to directly access the child device object, wherein the user environment applications, operating system drivers, and the child device object are stored on non-transitory tangible computer readable media associated with a same processor system; and
a bus driver stored on a non-transitory tangible computer readable medium, and configured to interface between each of the plurality of child device objects and an adapter coupled to one of a plurality of bus slots associated with a bus bridge that manages a bus.

23. The apparatus set forth in claim 22, comprising a management module associated with the bus and configured to provide the associated object name for each of the plurality of entries.

24. The apparatus set forth in claim 22, wherein the associated object name includes a class identifier of a child device object appended to an object name of the bus driver.

25. The apparatus set forth in claim 22, wherein the bus driver is operable to create the associated object name for each of the plurality of child device objects.

26. An apparatus for managing related drivers associated with a virtual bus driver, comprising:
a physical device object table stored on a non-transitory tangible computer readable medium, and configured to contain a plurality of entries, wherein each of the plurality of entries includes a physical device object entry, a class entry, a name entry, an address entry, and an additional information entry;
a plurality of child devices stored on a non-transitory tangible computer readable medium, and associated with each of the plurality of entries, each of the plurality of child devices having an associated name stored in the physical device object table, created from a combination of the name entry and one or more of the physical device object entry, the class entry, the address entry, or the additional information entry, the associated name configured to provide information about a child device in a computing system to allow user environment applications and operating system drivers of the computing system to directly access the child device; and
a virtual bus driver stored on a non-transitory tangible computer readable medium, and configured to interface between the plurality of child devices and an adapter.

* * * * *